US009027790B2

(12) United States Patent  (10) Patent No.: US 9,027,790 B2
Ciavarella et al.  (45) Date of Patent: May 12, 2015

(54) DISPENSERS FOR DILUTING A CONCENTRATED LIQUID AND DISPENSING THE DILUTED CONCENTRATE

(71) Applicants: Nick E. Ciavarella, Seven Hills, OH (US); Paul R. Metcalfe, Solon, OH (US); Scott E. Urban, University Heights, OH (US)

(72) Inventors: Nick E. Ciavarella, Seven Hills, OH (US); Paul R. Metcalfe, Solon, OH (US); Scott E. Urban, University Heights, OH (US)

(73) Assignee: GOJO Industries, Inc., Akron, OH (US)

( * ) Notice: Subject to any disclaimer, the term of this patent is extended or adjusted under 35 U.S.C. 154(b) by 0 days.

(21) Appl. No.: 13/787,416

(22) Filed: Mar. 6, 2013

(65) Prior Publication Data

US 2014/0110434 A1   Apr. 24, 2014

Related U.S. Application Data

(60) Provisional application No. 61/716,066, filed on Oct. 19, 2012.

(51) Int. Cl.
*B67D 7/74* (2010.01)
*A47K 5/14* (2006.01)
(Continued)

(52) U.S. Cl.
CPC ............... *A47K 5/14* (2013.01); *B05B 7/2443* (2013.01); *E03C 1/046* (2013.01)

(58) Field of Classification Search
CPC ............... B67D 7/74; B67D 7/76; B67D 7/78
USPC ............... 222/145.5–145.6, 190, 129.2, 133, 222/135–137, 372, 383.1, 325–327
See application file for complete search history.

(56) References Cited

U.S. PATENT DOCUMENTS

| 3,231,200 A | 1/1966 | Heald |
| 3,540,625 A | 11/1970 | Lambe |

(Continued)

FOREIGN PATENT DOCUMENTS

| EP | 1219752 | 7/2002 |
| FR | 2847602 | 5/2004 |

(Continued)

OTHER PUBLICATIONS

International Search Report and Written Opinion from International Application PCT/US2013/065565, date of mailing May 23, 2014.

*Primary Examiner* — Paul R Durand
*Assistant Examiner* — Andrew P Bainbridge
(74) *Attorney, Agent, or Firm* — Calfee, Halter & Griswold, LLP (57) ABSTRACT

Exemplary embodiments of dispensers are disclosed herein. One exemplary dispenser is a soap or sanitizer dispenser. The dispenser includes a housing. A removable and replaceable concentrate container for holding concentrated soap or sanitizer is located within the housing. A concentrate pump is in fluid communication with the concentrate container. A diluent container for holding a liquid is also located within the housing and a diluent pump for pumping the diluent is also included. The dispenser includes a mixing chamber in fluid communication with the concentrate pump and the diluent pump. The dispenser includes an outlet. When concentrated soap or sanitizer is pumped from the concentrate container, it mixes with diluent pumped from the diluent container to form a diluted mixture. The diluted mixture is dispensed at the outlet of the dispenser.

24 Claims, 8 Drawing Sheets

(51) Int. Cl.
*B05B 7/24* (2006.01)
*E03C 1/046* (2006.01)

(56) References Cited

U.S. PATENT DOCUMENTS

| | | |
|---|---|---|
| 3,581,998 A | 6/1971 | Roche |
| 3,612,355 A | 10/1971 | Stucky |
| 3,713,585 A | 1/1973 | Conklin |
| 4,047,541 A | 9/1977 | Mercier et al. |
| 4,840,311 A | 6/1989 | Shamblin |
| 4,956,883 A | 9/1990 | Lane |
| 4,971,105 A | 11/1990 | McGuire |
| 5,004,158 A | 4/1991 | Halem et al. |
| 5,135,173 A | 8/1992 | Cho |
| 5,402,916 A | 4/1995 | Nottingham et al. |
| 5,556,001 A * | 9/1996 | Weissman et al. ........ 222/1 |
| 5,803,312 A | 9/1998 | Credle, Jr. |
| 5,842,645 A | 12/1998 | Degongre et al. |
| 5,862,954 A * | 1/1999 | Ehrensperger et al. ....... 222/190 |
| 6,036,057 A * | 3/2000 | Poutiatine ................. 222/137 |
| 6,419,166 B1 | 7/2002 | Brzezinski et al. |
| 6,926,212 B1 | 8/2005 | Glass |
| 2003/0000967 A1* | 1/2003 | Ehrensperger et al. ....... 222/190 |
| 2006/0101575 A1 | 5/2006 | Louis |
| 2008/0073375 A1 | 3/2008 | Nelson |
| 2008/0277425 A1* | 11/2008 | Grasser et al. ............ 222/190 |
| 2008/0314452 A1* | 12/2008 | Smith ........................ 137/3 |
| 2009/0000024 A1 | 1/2009 | Louis |
| 2010/0051642 A1* | 3/2010 | Wong et al. ................. 222/52 |
| 2010/0213279 A1* | 8/2010 | Frederick ................... 239/310 |
| 2011/0027148 A1* | 2/2011 | Zlatic et al. ................ 422/266 |
| 2011/0101021 A1* | 5/2011 | Greer et al. ................... 222/1 |

FOREIGN PATENT DOCUMENTS

| | | |
|---|---|---|
| GB | 2356561 | 5/2001 |
| WO | 2005107699 A1 | 11/2005 |
| WO | 2009051501 A1 | 4/2009 |

* cited by examiner

DISPENSERS FOR DILUTING A CONCENTRATED LIQUID AND DISPENSING THE DILUTED CONCENTRATE

RELATED APPLICATIONS

This non-provisional utility patent application claims priority to and the benefits of U.S. Provisional Patent Application Ser. No. 61/716,066 filed on Oct. 19, 2012 and entitled DISPENSERS FOR DILUTING A CONCENTRATED LIQUID AND DISPENSING THE DILUTED CONCENTRATE. This application is incorporated herein by reference in its entirety.

TECHNICAL FIELD

The present invention relates generally to dispensers for diluting a concentrated liquid and dispensing the diluted concentrate liquid in a usable form, and more particularly to dispensers that mix together a concentrate and a diluent and dispense the mixture during a dispense cycle.

BACKGROUND OF THE INVENTION

Liquid dispenser systems, such as liquid soap and sanitizer dispensers, provide a user with a predetermined amount of liquid upon actuation of the dispenser. In addition, it is sometimes desirable to dispense the liquid in the form of foam by, for example, injecting air into the liquid to create a foamy mixture of liquid and air bubbles. Some dispensers contain a refill unit comprising a container full of liquid soap or sanitizer in a usable concentration and a pump to pump the liquid. During a dispense cycle, activating the pump causes a dose of the liquid to be dispensed. In a foam dispenser, the refill unit typically includes an air pump that causes air to be mixed with the liquid during a dispense cycle to form a foam that is dispensed.

SUMMARY

Exemplary embodiments of dispensers are disclosed herein. One exemplary dispenser is a soap or sanitizer dispenser. The dispenser includes a housing. A removable and replaceable concentrate container for holding concentrated soap or sanitizer is located within the housing. A concentrate pump is in fluid communication with the concentrate container. A diluent container for holding a liquid is also located within the housing and a diluent pump for pumping the diluent is also include. The dispenser includes a mixing chamber in fluid communication with the concentrate pump and the diluent pump. The dispenser includes an outlet. When concentrated soap or sanitizer is pumped from the concentrate container, it mixes with diluent pumped from the diluent container to form a diluted mixture. The diluted mixture is dispensed at the outlet of the dispenser.

Another exemplary embodiment of a dispenser includes a concentrate container for holding a concentrated liquid and a concentrate pump in fluid communication with the concentrate container. The dispenser includes an inlet for a receiving a diluent. A diluent pump is in fluid communication with the diluent inlet. A mixing chamber, which may be an intersection between a diluent passage and a concentrate passage, is in fluid communication with the concentrate pump and the diluent pump and the concentrate and diluent are mixed together to form a diluted mixture in the mixing chamber. A diluted mixture passageway extends from the mixing chamber to an outlet of the dispenser. The exemplary dispenser includes an air pump and an air passageway that is in fluid communication with the diluted mixture passageway. A mixing media is located downstream of the mixing chamber. During operation, the diluted mixture is mixed with compressed air and the air and diluted mixture flow through the mixing media and is dispensed at the outlet as a foam.

Another exemplary dispenser includes a container for holding a concentrated liquid and a concentrate pump for pumping the concentrated liquid. A concentrate passageway extends from the concentrate pump to a mixing chamber. The dispenser includes a diluent inlet and a diluent pump for pumping the diluent. A diluent passageway extends from the diluent pump to the mixing chamber. At least a portion of the diluent passageway is adjacent a concentrate pumping mechanism. Movement of the diluent pump causes movement of the concentrate pumping mechanism to pump the concentrate. The diluent and concentrate are mixed together in the mixing chamber and dispensed out an outlet located downstream of the mixing chamber.

BRIEF DESCRIPTION OF THE DRAWINGS

These and other features and advantages of the present invention will become better understood with regard to the following description and accompanying drawings in which.

DETAILED DESCRIPTION

Figure 1:
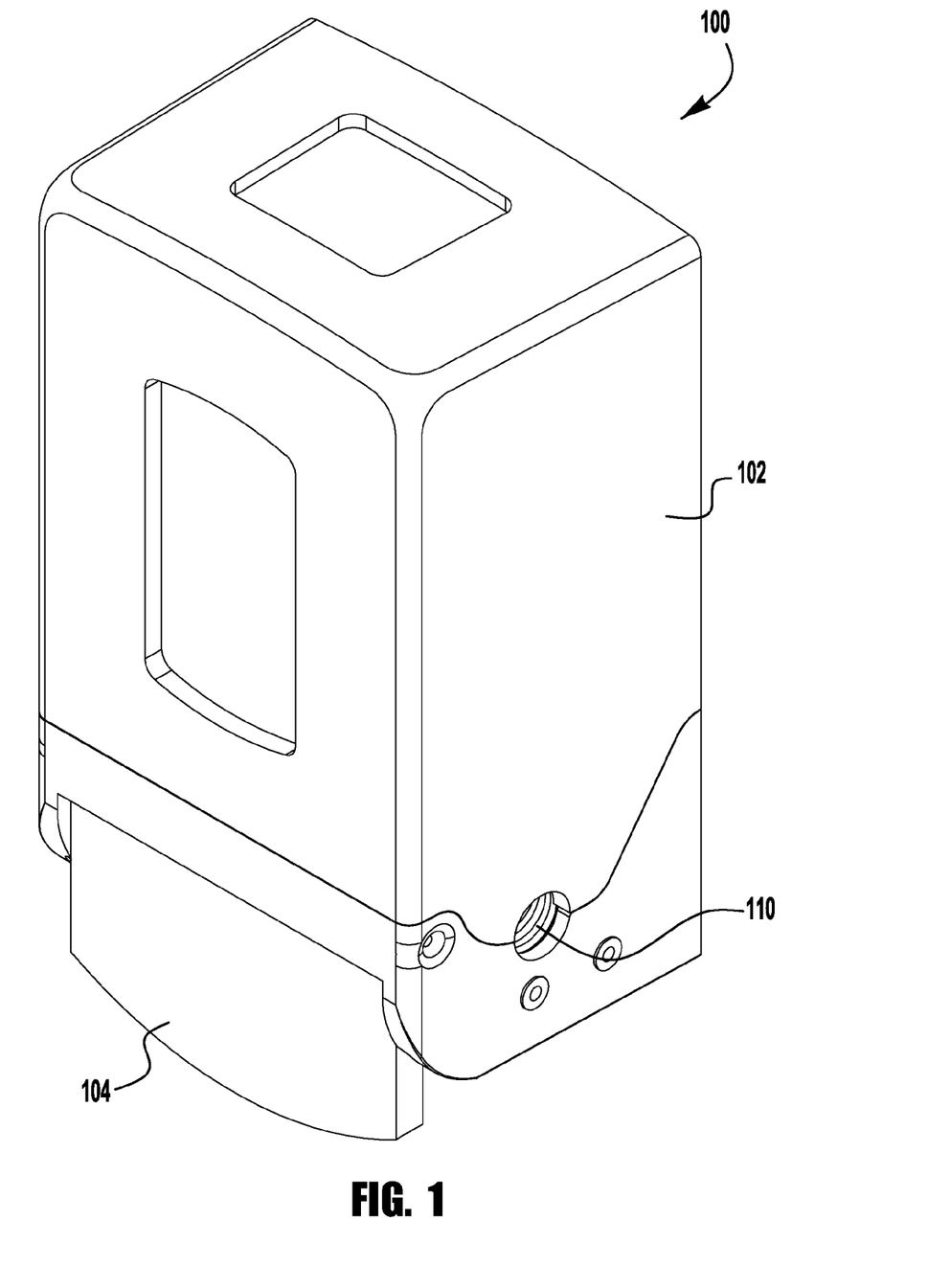
FIG. 1 is a prospective view of a liquid dispenser for mixing a concentrated liquid with an external diluent and dispensing the diluted concentrate mixture.
Figure 2:
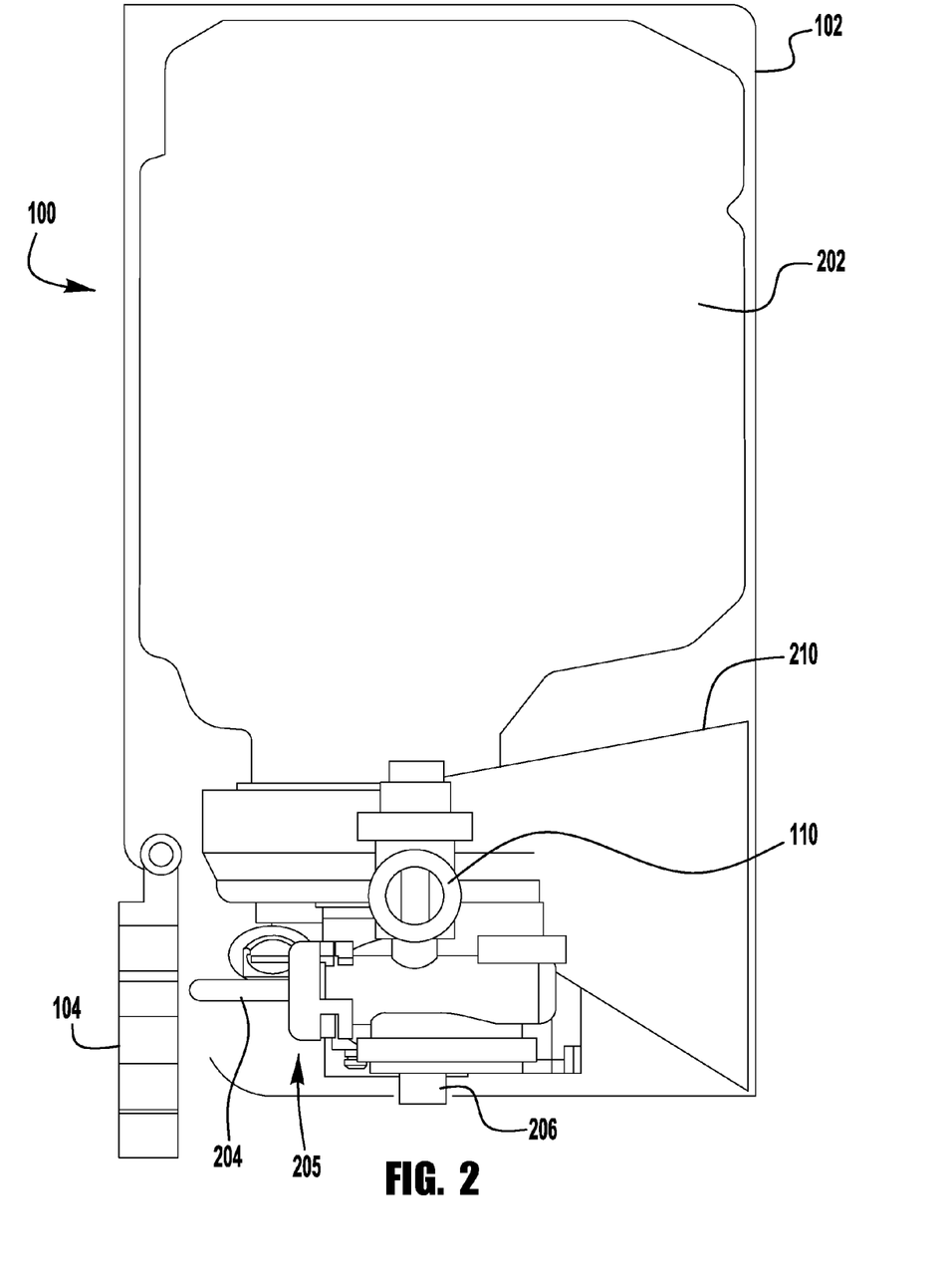
FIG. 2 is an elevational view of the liquid dispenser of FIG. 1 with the side of the dispenser housing removed.

FIG. 1 illustrates an exemplary embodiment of a dispenser 100. Dispenser 100 includes housing 102, an actuator 104 and a diluent inlet 110. Preferably, diluent inlet 110 is connected to a water source such as, for example, a shower fixture, a sink fixture, a potable water source or the like. FIG. 2 illustrates a cross-sectional view of the dispenser of FIG. 1 having a refill unit 202 installed. Refill unit 202 contains concentrated liquid, such as a concentrated soap. Refill unit 202 is connected to a pumping system 205. In one embodiment, pumping system 205 pumps the diluent and concentrated liquid, mixes the two liquids together, adds air to the mixture and dispenses the mixture as a foam through outlet 206. Pumping system 205 is secured to housing 102 by bracket 210.

Figure 3:
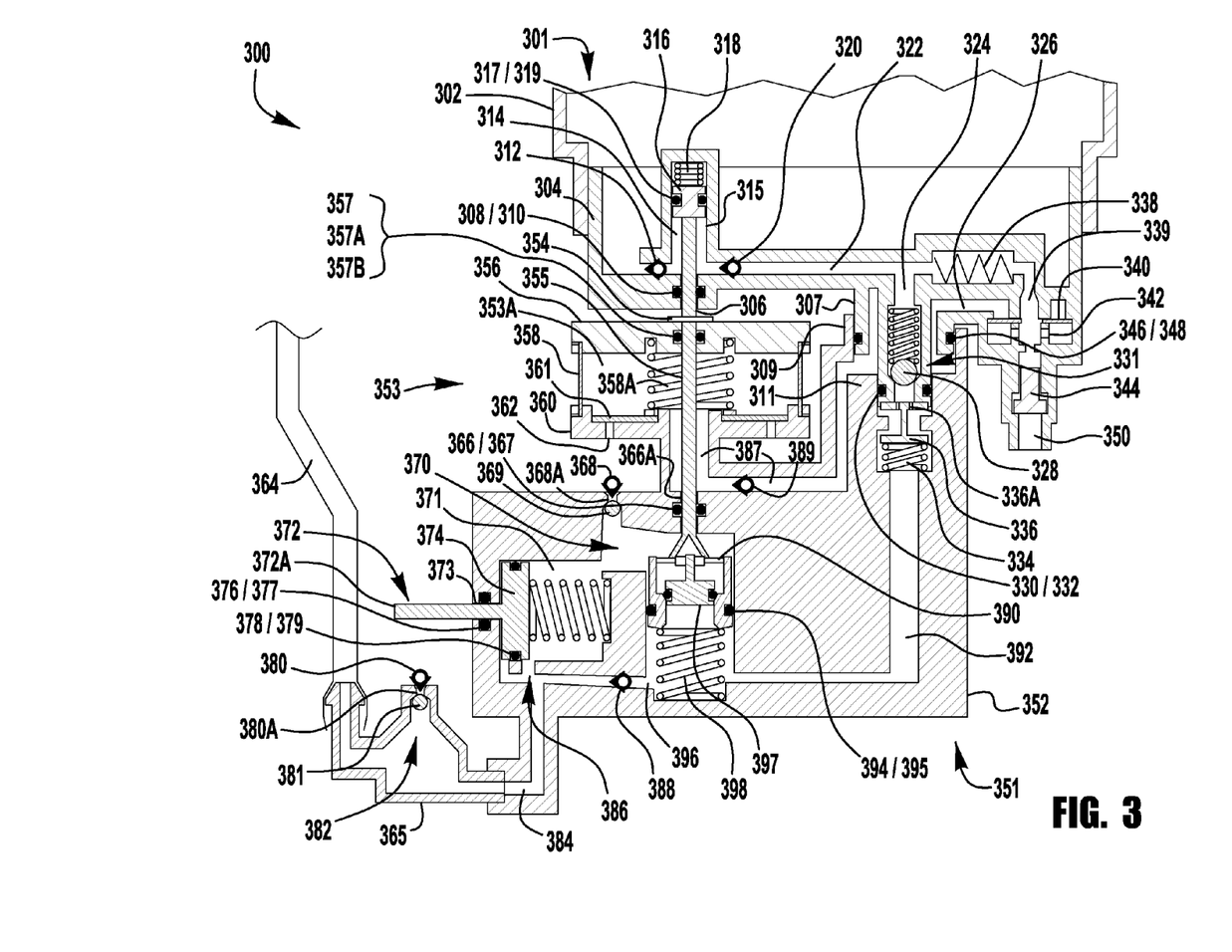
FIG. 3 is a cross-sectional schematic view of a dispenser for diluting a concentrated liquid and dispensing the diluted concentrate mixture as a foam with the dispenser shown in a rest position.
Figure 4:
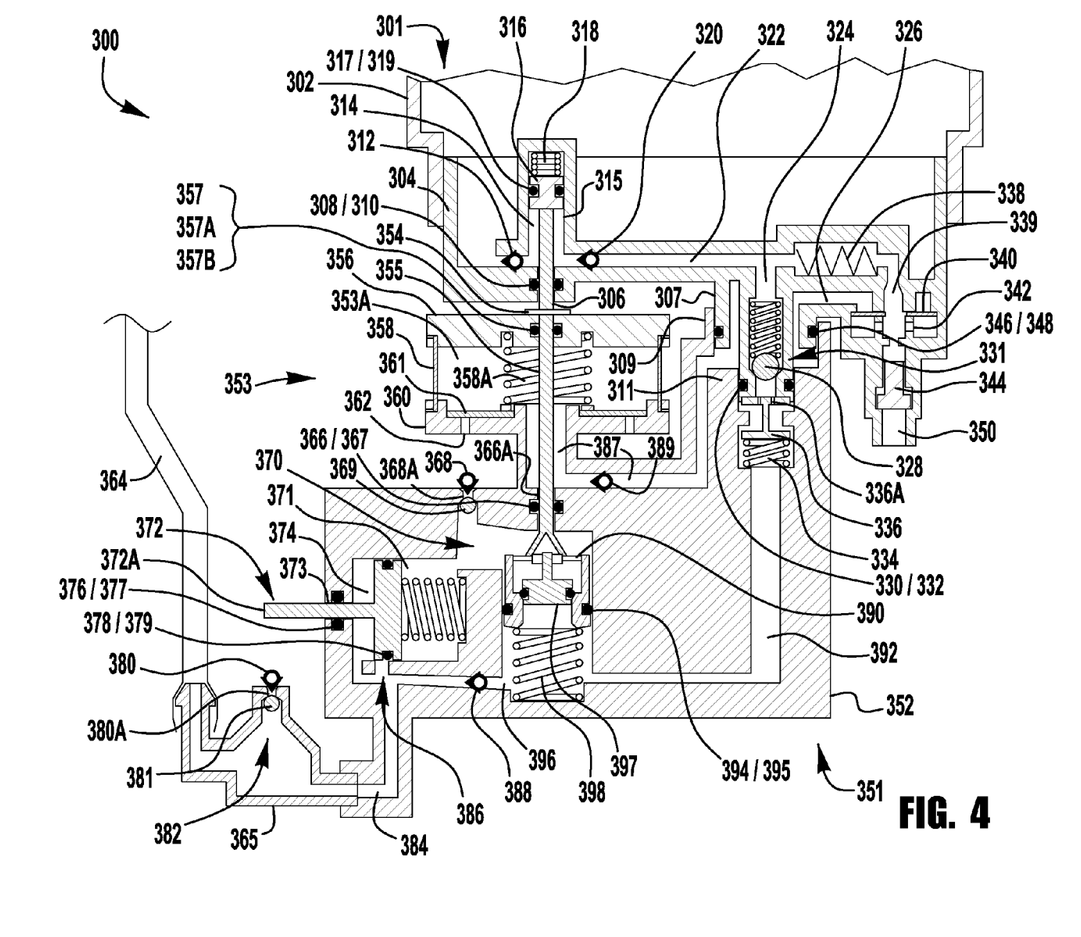
FIG. 4 is a cross-sectional schematic view of the dispenser of FIG. 3 being partially activated.
Figure 5:
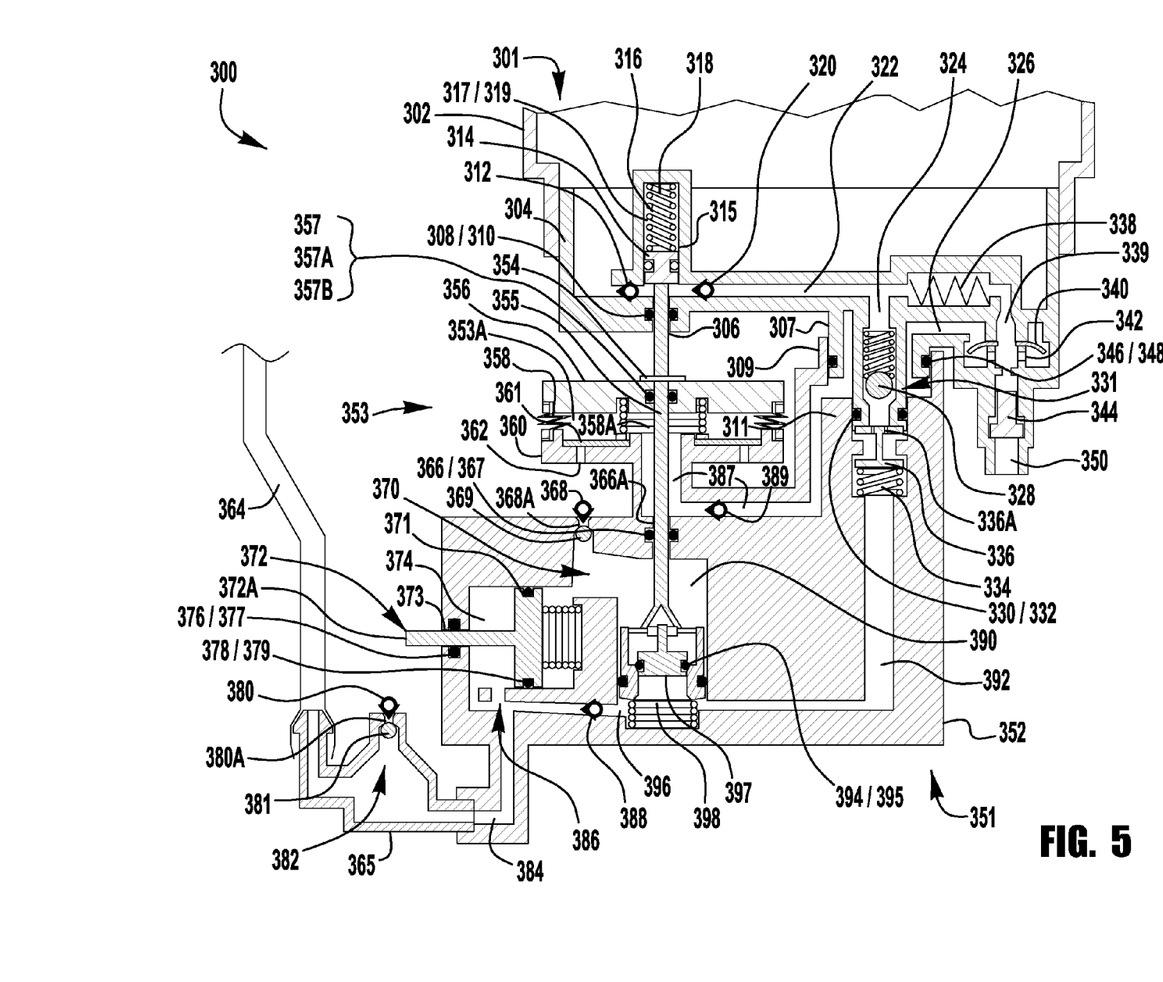
FIG. 5 is a cross-sectional schematic view of the dispenser of FIG. 3 in an activated position.
Figure 6:
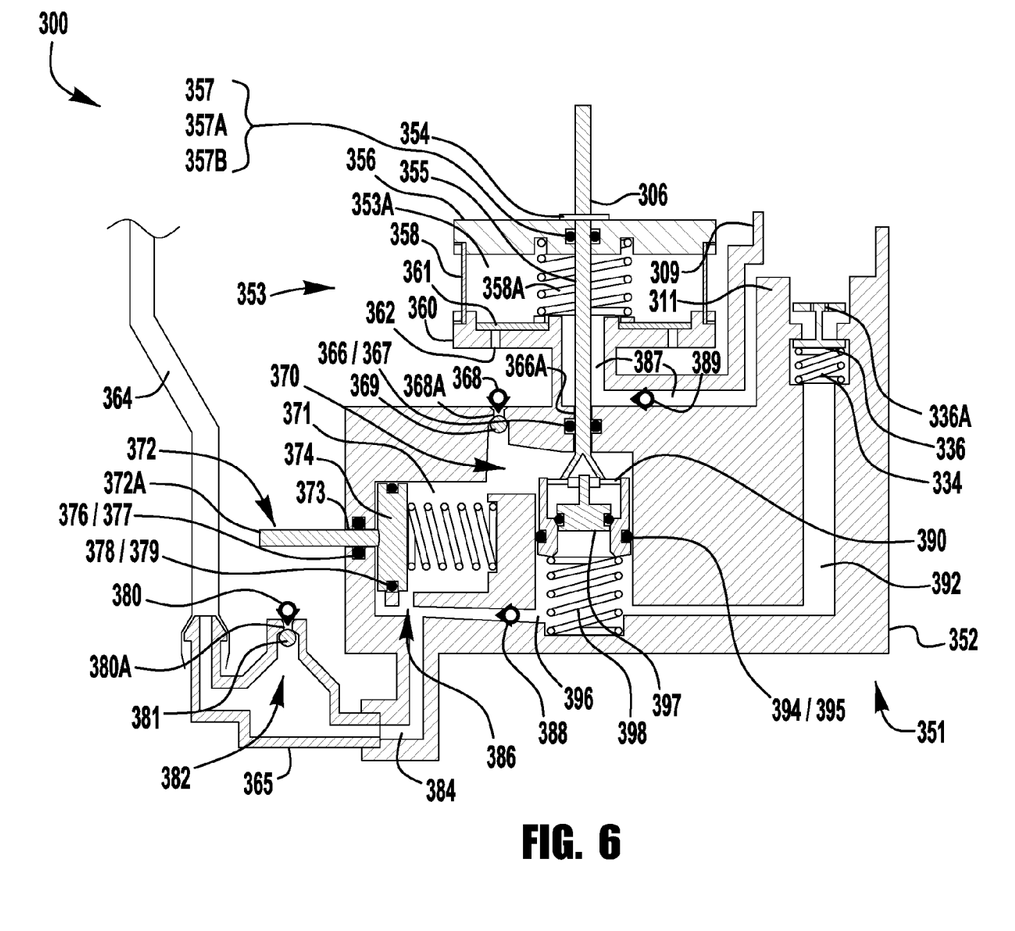
FIG. 6 is a cross-sectional schematic view of the pumping mechanism of the dispenser of FIG. 3 without the refill unit.

FIGS. 3-5 illustrate a cross-sectional schematic diagram of an exemplary dispenser 300 and concentrate refill unit 301 for diluting a concentrated mixture and dispensing the mixture as a foam. FIG. 6 illustrates a cross-section of the pumping mechanism of the dispenser 300. Although dispenser 300 is shown and described with an air compressor 353, some embodiments of the present invention do not include an air compressor 353 and associated components. Dispenser 300 includes a concentrate refill unit 301 and a pumping mechanism 351.

Refill unit 301 includes a container 302 for holding a concentrated foamable liquid secured to a cap 304. Refill unit 301 includes a pump chamber 314. Pump chamber 314 is defined by the area between concentrate liquid inlet valve 312 and concentrate liquid outlet valve 320. Inlet and outlet valves 312 and 320 may be any type of one-way check valves. Concentrate pump chamber 314 includes a cylindrical housing 315, a piston 316 and biasing member 318. In some embodiments, biasing member 318 is a spring. Piston 316 includes an annular groove 317 that contains a sealing member 319 such as, for example, an o-ring. An aperture 306 passes through the cap 304 into pumping chamber 314. An actuator rod 355 passes through the aperture 306. An annular groove 308 contains sealing member 310 that forms a seal around actuating rod 355. The end of actuator rod 355 moves concentrate piston 316 upward to draw concentrated liquid into pump chamber 314 and biasing member 318 moves piston 316 downward to pump concentrated liquid out of concentrate pump chamber 314. Extending from concentrate outlet valve 320 is a passage 322 that leads to mixing chamber 338. Mixing chamber 338 may contain one or more baffles (not shown). Optionally, the mixing chamber may simply be a point of intersection of passages that contain diluent and concentrate.

Cap 304 includes a first annular projection 307. First annular projection 307 includes an annular channel 346 that retains sealing member 348. Cap 304 includes a second annular projection 331. Second annular projection 331 includes an annular channel 330 that contains a sealing member 332 such as, for example, an o-ring. The area between first annular projection 307 and second annular projection 331 forms part of air passage 326 when the refill unit 301 is connected to the dispenser 300. The interior of second annular projection 331 forms a diluent passage 324. In addition, a one-way check valve 328 is located within second annular projection 331. The first and second annular projections 307, 331 fit within first and second receptacles 309 and 311, respectively, of pumping mechanism 351.

Cap 304 includes air passage 326 that includes a one-way valve 340. The one-way valve 340 may be, for example, a disk valve. Cap 304 includes an outlet passage 339, a mix media 344 located in outlet passage 339 and an outlet nozzle 350. Mix media 344 may be a mixing cartridge, one or more screens, baffles, sponges or other porous media. During operation, air traveling through passage 326 flows past one-way valve 340, through one or more apertures 342 into passage 339 where it mixes with a diluted concentrate mixture formed in mixing chamber 338. The air and diluted concentrate mixture and are forced through a mix media 344 and dispensed out of outlet 350 in the form of a foam.

Pumping mechanism 351 includes a body 352. Body 352 has a diluent inlet 384, a hydraulic pumping chamber 371, a diluent pump chamber 396, a diluent passage 392, an air passage 387, air compressor base 360, diluent piston 397, actuator rod 355, hydraulic piston 372, a plurality of check valves, 368, 389 and 396, floating ball valve 369, refill present valve 336, and a plurality of sealing members 368, 377, 379, which are discussed in more detail below.

A diluent source, such as water, is connected to diluent inlet 384. In one embodiment, the diluent source that supplies diluent to diluent inlet 384 is a tube 364 connected to a fixture, such as for example a showerhead similar to that shown and described with respect of FIG. 7. In such an embodiment, a tube 364 is connected to fitting 365. Fitting 365 has a chamber 382. Located within chamber 382 is a floating ball valve 381. Chamber 382 includes an opening 380A located in the top portion, and has a one-way check valve 380 located in the opening 380A. One-way check valve 380 prevents air from entering chamber 382 from opening 380A. If air is in fitting 365, floating ball valve 381 will not be sealed in the opening 380A because the diluent level in the fitting 365 will not be high enough to seat the floating ball valve 381. Accordingly, the air will flow out of opening 380A through one-way outlet valve 380 until the diluent level rises up and seats floating ball valve 381.

The diluent travels through passage 384, and flows through opening 386 into hydraulic pump chamber 371 and also flows past one-way check valve 388 into diluent pump chamber 396. In some embodiments, diluent flows past check valve 388 only when a vacuum exists in diluent pump chamber 396. Air that is trapped in hydraulic pump chamber 371 escapes through opening 368A. One-way check valve 368 allows air to escape from the hydraulic pump chamber 371 but prevents air from entering the hydraulic pump chamber 371 from the atmosphere. In addition, floating ball valve 369 prevents diluent from escaping from the hydraulic pump chamber 371 through opening 368A in the manner described above with respect to fitting 365.

Located at least partially within hydraulic chamber 371 is hydraulic piston 372. Piston 372 includes a piston head 374. Piston head 374 includes a sealing member 379 located within annular groove 378. Sealing member 379 provides a seal against the interior walls of hydraulic chamber 371. Although sealing member 379 is illustrated as an o-ring, any type of sealing member may be used such as, for example, a wiper seal. Body 352 includes an opening 373 through which stem 372A of piston 372 passes. An annular groove 376 within opening 372A holds sealing member 377, which forms a seal around piston stem 372A. A biasing member 370, such as, for example, a spring, is positioned within hydraulic chamber 371 to bias piston 372 outward so that the volume of hydraulic chamber 371 is expanded and diluent may flow into hydraulic chamber 371.

Located at least partially within diluent pump chamber 396 is piston 397. Piston 397 is biased by biasing member 398 to expand the volume of diluent pump chamber 396 to an expanded position. An annular groove 394 is located in piston 397 and contains a sealing member 395. The sealing member 395 seals against the walls of the diluent pump chamber 396.

Connected to piston 397 is actuator rod 355. Actuator rod 355 extends up through body 352 through opening 366A. An annular groove 366 is located in opening 366A and holds sealing member 367. Sealing member 367 seals against actuator rod 355 to prevent diluent fluid from flowing out of hydraulic chamber 371. Actuator rod 355 extends up through air passage 387, through air chamber 353A of air compressor 353, and extends through aperture or opening 357A of top plate 356. Aperture 357A includes an annular channel 357, which retains sealing member 357B. Sealing member 357B may be any type of sealing member, such as, for example, an o-ring. Actuator rod 355 extends above the top plate 356 of air compressor 353 and fits up into concentrate pump chamber 314 when a refill unit 301 is installed in a dispenser and mated with pumping mechanism 351. A retaining ring 354 fits securely over actuator rod 355. Retaining ring 354 may be installed with a press-fit type connection. Retaining ring 354 prevents top plate 356 from moving further up actuator rod 355 and causes air chamber 353A to contract as actuator rod 355 moves downward.

Air compressor 353 includes a bellows 358, a biasing member 358A, one or more air inlets 362 and one-way air inlet valve 361. Air inlet valve 361 may be, for example, a flexible disk valve. In addition, biasing member 358A biases air compressor chamber 353A toward its expanded position. An air passage 387 leads from air compressor 353, past one-way check valve 389, through air passage 326 in refill unit 301, past one-way valve 340, through apertures 342 into outlet passage 339.

Diluent outlet passage 392 leads from diluent pumping chamber 396 past refill present valve 336 and apertures 336A in refill present valve 336, past check valve 331, through passage 324 and into mixing chamber 338. Refill present valve 336 is biased to the closed position by biasing member 334. Accordingly, when no refill is present, refill present valve 336 is biased to a closed position.

Although pumping mechanism 351 and cap 304 have been shown and described as single components, they may be made up of multiple components. Further, the components may be in different locations or operated by different mechanisms. For example, air compressor 353 may be directly activated by the actuator that actuates hydraulic piston 372. In some embodiments, an air compressor is not needed, and the air compressor 353 may be removed in its entirety. In addition, the diluent source connected to diluent inlet 364 may be from an outside source or fixture such as a showerhead or waterline, or may be connected to a container located in the dispenser housing.

FIG. 6 illustrates the pumping mechanism 351 in a dispenser 300 without a refill connected thereto and accordingly, refill present valve 336 is biased to a closed position.

Operation of the exemplary dispenser 300 is best described with respect to FIGS. 3-6. A refill unit 301 is inserted on dispenser pumping mechanism 351. Prior to inserting refill unit 301 onto dispenser pumping mechanism 351, refill present valve 336 is biased to a closed position (FIG. 6). When the refill unit 301 is properly inserted into dispenser 300, second cylindrical projection 331 engages refill present valve 336 and moves it to an open position (FIG. 1). FIG. 1 illustrates the dispenser 300 at rest. While at rest, diluent flows through tube 364 into fitting 365 where air is purged through one-way check valve 380. In addition, once the diluent fills fitting 365, floating ball valve 381 rises due to the fluid level and seals opening 380A. The diluent flows into pumping mechanism 351 through passage 384. The diluent flows into hydraulic pumping chamber 371 through opening 386 and past one-way check valve 388 into diluent pumping chamber 396. Air that enters hydraulic chamber 371 escapes through opening 368A and check valve 368. Once hydraulic chamber 371 is filled with diluent, floating ball valve 369 seals opening 368A. At this stage, the dispenser 300 is primed and ready to dispense. When first connecting to a diluent source such as, for example, a container of water, the system may require a few strokes of the actuator to prime the dispenser system 300.

FIG. 4 illustrates the dispenser 300 being actuated. Piston 372 is moved inward past opening 386 sealing the hydraulic chamber 371 off from the diluent source. Continued movement of piston 372 causes hydraulic pressure which moves piston 397 downward by asserting pressure on surface 390 and pumps diluent through diluent outlet passage 392, past refill present valve 336, past one-check valve 328, through passage 324 and into mixing chamber 338. In addition, movement of piston 397 causes movement of actuator rod 355, which compresses air compressor 353 and moves downward in concentrate pump chamber 314. Movement of actuator rod 355 allows biasing member 318 to move piston 316 downward to compress the volume of concentrate pumping chamber 314, which pumps concentrated liquid past one-way check valve 320 through passage 322 and into mixing chamber 338. The concentrate liquid and diluent liquid mix together in mixing chamber 338 to form a diluted concentrate mixture. As the volume of air chamber 353A is compressed due to downward movement of actuator rod 355, air is forced through passage 387, past one-way check valve 389, through passage 326, past one-way valve 340 through aperture 342 into outlet passage 339 where the air mixes with the diluted concentrate mixture and is forced through foaming cartridge 344. The air and diluted concentrate mixture are turned into a rich foam that is dispensed out of outlet nozzle 350.

When the dispenser actuator (not shown) moves back or out of the way, piston 372 moves back toward its rest position, piston 397 moves back to its rest position and air chamber 353A moves back to its rest position due to biasing member 370, biasing member 398, and biasing member 358A, respectively. In this embodiment, all three biasing members aid in the movement of all of the components because the components are either mechanically or hydraulically linked together. Actuator rod 355 also pushes piston 316 upward. Movement of piston 316 upward creates a vacuum in concentrate pumping chamber 314, which draws in concentrate from container 302 past one-way check valve 312. The expansion of the volume of diluent pumping chamber 396 causes diluent to be drawn in from the diluent source past one-way check valve 388 into diluent pumping chamber 396.

If the diluent supply for diluent inlet 384 is shut off or runs out, and there is any diluent in hydraulic pumping chamber 371, movement of the actuator (not shown) will not move piston 372 inward. This is because there is no diluent in the hydraulic pumping chamber 371 and so floating ball valve 369 will not seal opening 368A, and movement of piston 372 pushes the air out of opening 368A, past outlet check valve 368 and does not move piston 397 and actuator rod 355. Thus, if there is no diluent, the dispensing system 300 will not attempt to dispense. This is particularly beneficial so that the concentrated liquid is not dispensed to a user's hand as the concentrated liquid may cause irritation.

Optionally, concentrate piston 316 may contain its own actuating rod that may link with actuator rod 355 so that actuator rod 355 does not enter concentrate pump chamber 314 and contact the concentrate. Thus, in such an embodiment, all of the parts that contact the concentrated liquid may be removed with the refill unit 301.

Figure 7:
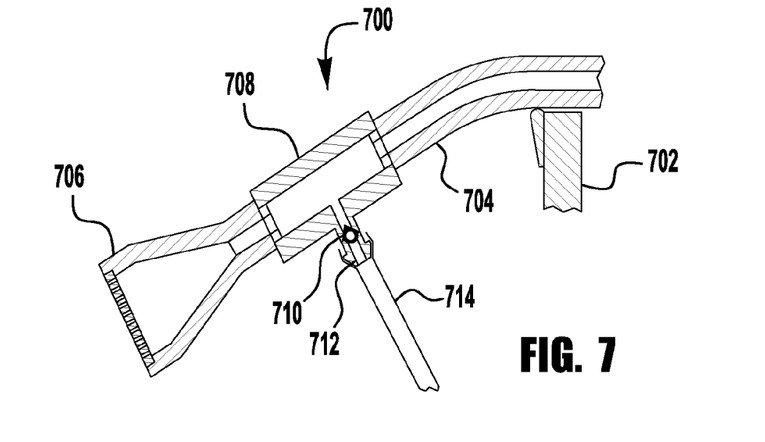
FIG. 7 illustrates an exemplary embodiment of a fixture for use as a water source.

FIG. 7 illustrates a diluent source 700. In this embodiment, a diluent source 700 is a fixture. The exemplary fixture includes a shower pipe extension 704 that extends through a shower wall 702. A tee fitting 708 is located between the shower pipe extension 704 and showerhead 706. The tee fitting 708 has a threaded connection that mates with the shower pipe extension 704 and the showerhead 706. The tee portion of tee fitting 708 contains a one-way check valve 710 to prevent fluid from flowing up from tube 714 and out of showerhead 706. A similar connection could be used with other fixtures, such as a faucet. Other exemplary embodiments of diluent sources include, for example, under-counter faucet connections, waterlines, etc.

Figure 8:
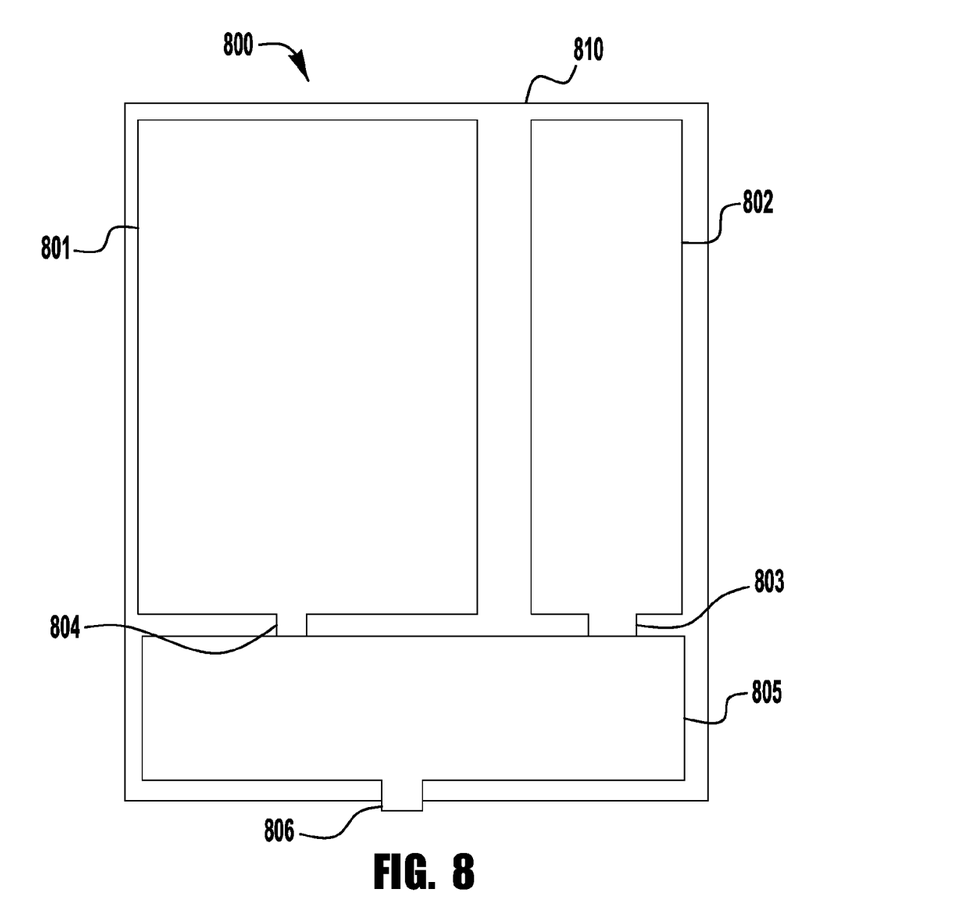
FIG. 8 is a cross-sectional view of a liquid dispenser 800 for mixing a concentrated liquid with a diluent and dispensing the diluted mixture.

FIG. 8 illustrates a cross-sectional view of an exemplary concentrated liquid dispenser 800 for use with a diluent supplied in a container 801. Dispenser 800 includes a pumping mechanism 805 and an outlet nozzle 806. Pumping mechanism 805 may be similar to pumping mechanism 351. In this embodiment, however, a diluent supply inlet is shown generically, and diluent inlet 384 is replaced by diluent inlet supply 804, which is connected to diluent container 801. Diluent container 801 contains a diluent, such as, for example, water. In addition, the diluent may be a combination of substances, such as, for example, water and an additive. The additive may be an additive that reacts with concentrate liquid, or may be a disinfectant or biocidal agent. In addition, container 801 may be refillable.

In one embodiment, container 801 may have a commercially available fitting (not shown) that allows a user to fill the container 801 from a supply source such as, for example, a faucet and then invert the container 801 to insert it in the dispenser 800 without the contents of the container 801 spilling or escaping when the container 801 is inverted. Dispenser 800 includes a concentrate container 802 that is connected to pumping mechanism 805. The concentrate container 802 is removable and replaceable. Pumping mechanism 805 may be a single part, made up of multiple parts or may be configured as the pumping mechanism 351 in FIG. 3 so that most if not all of the components that contact the concentrate or diluted concentrate are replaceable with the concentrated container 802. In addition, container 801 and/or container 802 may include one or more vents (not shown) to allow air to replace fluid removed from the containers 801, 802.

Figure 9:
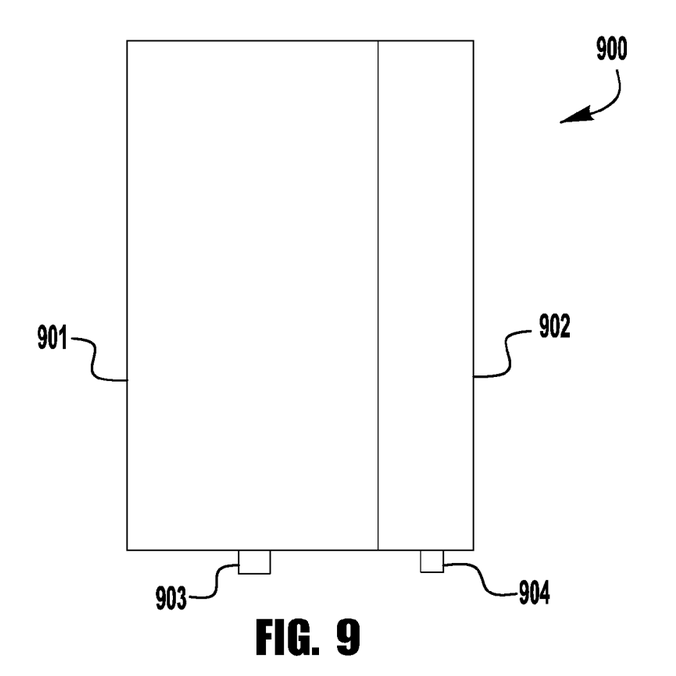
FIG. 9 is a two-chamber bottle for use in a dispenser that mixes a concentrate and a diluent.

FIG. 9 illustrates a two-chamber bottle 900 for use in a dispenser (not shown) that mixes a concentrate and a diluent. Two-chamber bottle 900 includes a first portion 901 with a first associated outlet 903 and a second portion 902 with an associated second outlet 904. The two-chamber bottle 900 may include one or more vents (not shown) to vent the chambers. Chambers 901 and 902 may be collapsible or may be vented through a pumping mechanism (not shown). One advantage of the two-chamber bottle 900 is that one of the chambers 902 may be filled with a concentrated fluid prior to shipping and the second chamber 901 may be filled by a user prior to use. Thus, the cost to ship the two-chamber bottle 900 may be less than a conventional refill unit containing a ready to use fluid because of the reduced weight due to the second chamber 902 being shipped empty.

Figure 10A:
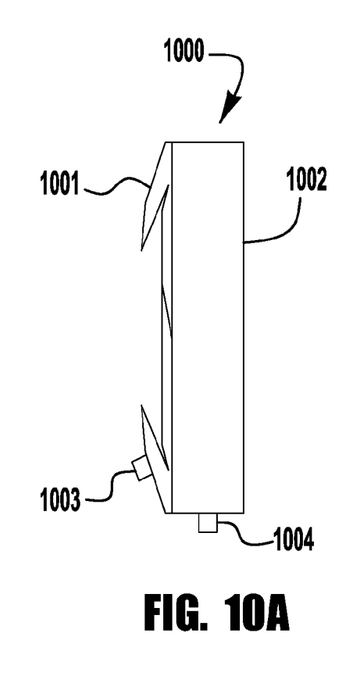
FIG. 10A illustrates a collapsible two-chamber bottle having one side shown collapsed and one side expanded.
Figure 10B:
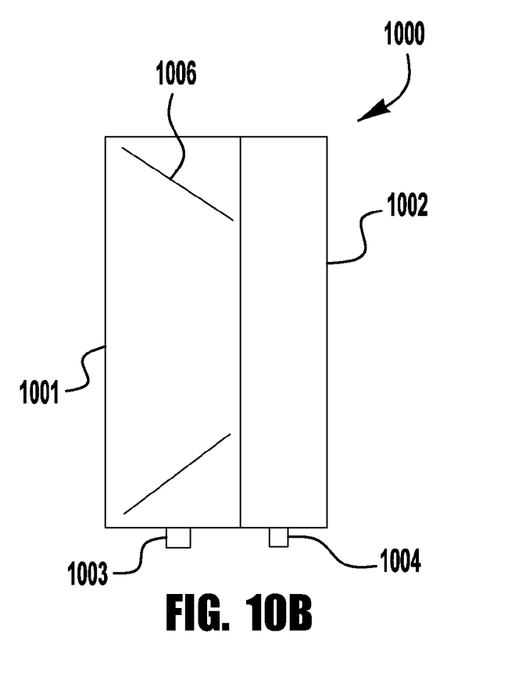
FIG. 10B illustrates the collapsible bottle with both chambers expanded.

FIG. 10A illustrates an exemplary embodiment of a collapsible two-chamber bottle 1000 having one chamber 1001 shown collapsed and one chamber 1002 expanded and FIG. 10B illustrates the collapsible two-chamber bottle 1000 with both chambers 1001, 1002 expanded. In FIG. 10A a concentrated fluid has been added to chamber 1002 while chamber 1003 is collapsed for shipping. Chamber 1001 includes an outlet 1003 and chamber 1002 includes an outlet 1004. Outlet 1003 may also be used to fill chamber 1001 with a diluent. Collapsible two-chamber bottle 1000 has a reduced shipping weight and a reduced shipping volume. A user simply unpackages container 1000, fills chamber 1001 with a diluent, such as water, and installs the container in a dispensing system. Chamber 1001 and/or chamber 1002 may include a vent (not shown) to allow air to replace fluid removed from the chambers 1001, 1002. Optionally, chambers 1001 and 1002 may be configured to collapse and reduce the interior volume of the chambers 1001, 1002 when the fluid is removed.

While the present invention has been illustrated by the description of embodiments thereof and while the embodiments have been described in considerable detail, it is not the intention of the applicants to restrict or in any way limit the scope of the appended claims to such detail. Additional advantages and modifications will readily appear to those skilled in the art. Moreover, elements described with one embodiment may be readily adapted for use with other embodiments. Therefore, the invention, in its broader aspects, is not limited to the specific details, the representative apparatus and illustrative examples shown and described. Accordingly, departures may be made from such details without departing from the spirit or scope of the applicants' general inventive concept.

We claim:

1. A soap or sanitizer dispenser comprising:
a housing;
a removable and replaceable concentrate container for holding concentrated soap or sanitizer located within the housing;
a concentrate pump in fluid communication with the concentrate container;
a diluent container for holding a liquid located within the housing;
a diluent pump with a biasing force for pumping the diluent;
a mixing chamber in fluid communication with the concentrate pump and the diluent pump; and
an outlet;
wherein concentrated soap or sanitizer pumped from the concentrate container mixes with diluent pumped from the diluent container to form a diluted mixture and the diluted mixture is dispensed at the outlet;
wherein the diluent is used to hydraulically move the concentrate pump.

2. The soap or sanitizer dispenser of claim 1 wherein the concentrate container is removable and replaceable when empty.

3. The soap or sanitizer dispenser of claim 2 wherein the concentrate pump is secured to the concentrate container and is removed with the concentrate container when the concentrate is empty.

4. The soap or sanitizer dispenser of claim 1 wherein the diluent container is refillable.

5. The soap or sanitizer dispenser of claim 4 wherein the diluent container is replaceable.

6. The soap or sanitizer dispenser of claim 1 wherein diluent from the diluent container must be present in the dispenser for the concentrate pump to pump.

7. The soap or sanitizer dispenser of claim 1 wherein diluent is used to hydraulically move the concentrate pump.

8. The soap or sanitizer dispenser of claim 1 further comprising an air pump and a mix media, wherein the concentrate and diluent are mixed in the mixing chamber, pressurized air is added to the diluted mixture, the air and diluted mixture travel through the mix media and are dispensed out of the outlet as a foam.

9. The soap or sanitizer dispenser of claim 1 wherein the diluent container and the concentrate container are two chambers of a single container.

10. The soap or sanitizer dispenser of claim 1 wherein the diluent container is collapsible.

11. The soap or sanitizer dispenser of claim 1 wherein the diluent container is separate from the concentrate container.

12. A dispenser comprising:
a concentrate container for holding a concentrated liquid;
a concentrate pump in fluid communication with the concentrate container;
an inlet for a diluent;
a diluent pump with a biasing force in fluid communication with the diluent inlet;

a mixing chamber in fluid communication with the concentrate pump and the diluent pump wherein the concentrate and diluent are mixed together to form a diluted mixture;

a diluted mixture passageway from the mixing chamber to an outlet of the dispenser;

an air pump;

an air passageway in fluid communication with the diluted mixture passageway;

a mixing media located downstream of the mixing chamber;

wherein the diluted mixture is mixed with compressed air from the air pump and the air and diluted mixture flow through the mixing media and is dispensed at the outlet as a foam; and wherein the diluent is used to hydraulically move the air pump.

13. The dispenser of claim 12 wherein the diluent inlet connected to a diluent container.

14. The dispenser of claim 13 wherein the concentrate container and the diluent container are two portions of a single container and at least a portion of the diluent container is collapsible for shipping.

15. The dispenser of claim 12 wherein the diluent inlet connects to a water source.

16. The dispenser of claim 12 wherein diluent is required to operate the concentrate pump.

17. A dispenser comprising:
a concentrate container for holding a concentrated liquid;
a concentrate pump in fluid communication with the concentrate container;
an inlet for a diluent;
a diluent pump with a biasing force in fluid communication with the diluent inlet;
a mixing chamber in fluid communication with the concentrate pump and the diluent pump wherein the concentrate and diluent are mixed together to form a diluted mixture;
a diluted mixture passageway from the mixing chamber to an outlet of the dispenser;
an air pump;
an air passageway in fluid communication with the diluted mixture passageway;
a mixing media located downstream of the mixing chamber;
wherein the diluted mixture is mixed with compressed air from the air pump and the air and diluted mixture flow through the mixing media and is dispensed at the outlet as a foam;
wherein diluent is used to hydraulically move the concentrate pump; and
wherein diluent is required to operate the concentrate pump.

18. A dispenser comprising:
a concentrate container for holding a concentrated liquid;
a concentrate pump in fluid communication with the concentrate container;
an inlet for a diluent;
a diluent pump with a biasing force in fluid communication with the diluent inlet;
a mixing chamber in fluid communication with the concentrate pump and the diluent pump wherein the concentrate and diluent are mixed together to form a diluted mixture;

a diluted mixture passageway from the mixing chamber to an outlet of the dispenser;
an air pump;
an air passageway in fluid communication with the diluted mixture passageway;
a mixing media located downstream of the mixing chamber;
wherein the diluted mixture is mixed with compressed air from the air pump and the air and diluted mixture flow through the mixing media and is dispensed at the outlet as a foam;
wherein diluent is used to hydraulically move the concentrate pump; and
wherein the concentrate pump is a piston pump and the pressure by the diluent moves the piston.

19. A dispenser comprising:
a container for holding a concentrated liquid;
a concentrate pump for pumping the concentrated liquid;
a concentrate passageway from the concentrate pump to a mixing chamber;
a diluent inlet;
a diluent pump with a biasing force for pumping the diluent;
a diluent passageway from the diluent pump to the mixing chamber;
wherein at least a portion of the diluent passageway is adjacent a concentrate pumping mechanism;
wherein movement of the diluent pump shuts off the diluent supply and causes movement of the concentrate pumping mechanism to pump the concentrate; and
wherein the diluent and concentrate are mixed together in the mixing chamber and dispensed at an outlet located downstream of the mixing chamber.

20. The dispenser of claim 19 further comprising a diluent container in fluid communication with the diluent inlet for holding a supply of diluent.

21. The dispenser of claim 19 wherein the diluent inlet is connectable to a water supply.

22. The dispenser of claim 21 wherein the water supply is a shower or a faucet water supply.

23. A dispenser comprising:
a container for holding a concentrated liquid;
a concentrate pump for pumping the concentrated liquid;
a concentrate passageway from the concentrate pump to a mixing chamber;
a diluent inlet;
a diluent pump with a biasing force for pumping the diluent;
a diluent passageway from the diluent pump to the mixing chamber;
wherein at least a portion of the diluent passageway is adjacent a concentrate pumping mechanism;
wherein movement of the diluent pump causes movement of the concentrate pumping mechanism to pump the concentrate; and
wherein the diluent and concentrate are mixed together in the mixing chamber and dispensed at an outlet located downstream of the mixing chamber; and
an air pump and an air passageway for placing the air pump in fluid communication with the mixture of the diluent and the concentrate prior to being dispensed out of the outlet.

24. The dispenser of claim 19 wherein the diluent is water and the concentrate is a soap.

* * * * *